(12) United States Patent
Chang

(10) Patent No.: US 10,828,736 B2
(45) Date of Patent: Nov. 10, 2020

(54) DISTANCE ADJUSTMENT MECHANISM HAVING A LOCK WEDGE FOR FENCE ASSEMBLY OF TABLE SAW

(71) Applicant: Chin-Chin Chang, Taichung (TW)

(72) Inventor: Chin-Chin Chang, Taichung (TW)

( * ) Notice: Subject to any disclaimer, the term of this patent is extended or adjusted under 35 U.S.C. 154(b) by 0 days.

(21) Appl. No.: 16/435,505

(22) Filed: Jun. 9, 2019

(65) Prior Publication Data

US 2020/0180087 A1 Jun. 11, 2020

Related U.S. Application Data

(63) Continuation-in-part of application No. 16/214,054, filed on Dec. 8, 2018.

(51) Int. Cl.
| | |
|---|---|
| *B23Q 1/28* | (2006.01) |
| *B23Q 3/00* | (2006.01) |
| *B27B 5/22* | (2006.01) |
| *B27B 27/10* | (2006.01) |
| *B23D 47/04* | (2006.01) |

(52) U.S. Cl.
CPC ............... *B23Q 1/28* (2013.01); *B23D 47/04* (2013.01); *B23Q 3/005* (2013.01); *B27B 5/222* (2013.01); *B27B 27/10* (2013.01)

(58) Field of Classification Search
CPC ......... B27B 27/00; B27B 27/02; B27B 27/08; B27B 27/10; B27B 5/222; B27B 5/24; B27B 5/243; B27B 5/265; B27B 25/10; B23D 47/025; B23D 47/04; B23D 47/045; B27G 19/02; Y10T 83/773; Y10T 83/727; Y10T 83/7647; Y10T 83/73; Y10T 83/732; Y10T 83/734; Y10T 83/7722; Y10T 83/7684; Y10T 83/7705; B23Q 1/28; B23Q 1/285; B23Q 3/005; B23Q 3/007

USPC .................................. 144/286.5, 287, 286.1
See application file for complete search history.

(56) References Cited

U.S. PATENT DOCUMENTS

| | | | | |
|---|---|---|---|---|
| 1,938,548 | A * | 12/1933 | Tauts ........................ | B23Q 1/74 83/438 |
| 4,658,687 | A * | 4/1987 | Haas ........................ | B27B 27/02 269/238 |
| 6,293,176 | B1 * | 9/2001 | Talesky ................ | B23D 47/025 144/286.1 |
| 2002/0078810 | A1 * | 6/2002 | Talesky ................... | B27B 27/02 83/438 |
| 2002/0134212 | A1 * | 9/2002 | Ceroll .................... | B23Q 3/007 83/438 |

(Continued)

*Primary Examiner* — Evan H MacFarlane

(57) ABSTRACT

A fence assembly of a table saw includes rear and front sliding members on two rails of a table respectively, the rear sliding member having three top projections, the front sliding member having three forward projections, a transverse member interconnecting the sliding members, and a spring biased workpiece guide bar on the transverse member. The workpiece guide bar includes a front locking element for locking the front sliding member, a rear locking element for locking the rear sliding member, the rear locking element having a recess for receipt of the top projection, and a spring biased lever pivotably secured to a front end of the workpiece guide bar. A latch of the lever can be engaged with a protuberance of the front locking element to lock the front locking element or disengaged from the protuberance to unlock same. The lever includes a wedge for locking the front sliding member.

1 Claim, 21 Drawing Sheets

(56) References Cited

U.S. PATENT DOCUMENTS

| | | | |
|---|---|---|---|
| 2003/0079592 A1* | 5/2003 | Lee | B23D 47/025 83/438 |
| 2005/0204884 A1* | 9/2005 | Huang | B23D 47/025 83/477.2 |
| 2006/0070503 A1* | 4/2006 | Shibata | B27B 27/02 83/438 |
| 2006/0090619 A1* | 5/2006 | Huang | B27B 27/02 83/438 |
| 2010/0269656 A1* | 10/2010 | Frolov | B27B 5/243 83/438 |
| 2011/0017040 A1* | 1/2011 | Folov | B26D 7/01 83/446 |
| 2011/0048201 A1* | 3/2011 | Frolov | B27B 27/10 83/446 |
| 2015/0059546 A1* | 3/2015 | Chang | B27B 27/08 83/438 |
| 2016/0288361 A1* | 10/2016 | Chang | B23D 47/025 |
| 2017/0057112 A1* | 3/2017 | Chen | B27B 27/08 |

\* cited by examiner

US 10,828,736 B2

DISTANCE ADJUSTMENT MECHANISM HAVING A LOCK WEDGE FOR FENCE ASSEMBLY OF TABLE SAW

CROSS-REFERENCE TO RELATED APPLICATION

This application is a continuation-in-part (CIP) of U.S. patent application Ser. No. 16/214,054, filed Dec. 8, 2018, which is incorporated herein by reference in its entirety.

BACKGROUND OF THE INVENTION

1. Field of the Invention

The invention relates to table saws and more particularly to a fence assembly having a mechanism for adjusting a distance between itself and a saw assembly of a table saw.

2. Description of Related Art

A conventional fence assembly A of a table saw is shown in FIGS. 1 and 2 and includes a transverse bar A1, two levers A2 at two ends of the bar A1 respectively, and two U-shaped openings A3 each secured to an end of the bar A1. Each U-shaped opening A3 is adapted to lockingly receive one of two lengthwise rails B.

In a positioning operation, a user has to manually operate the levers A2 to lock the lengthwise rails B respectively. However, the user may cross the table of the table saw to operate the levers A2 for locking and this operation is not convenient.

Thus, the need for improvement still exists.

SUMMARY OF THE INVENTION

It is therefore one object of the invention to provide a table saw comprising a table assembly including a table and two rails on front and rear ends of the table respectively; a base assembly for supporting the table assembly; a saw assembly disposed on the table assembly; a height adjustment assembly disposed on a front surface of the base assembly; and a fence assembly including rear and front sliding members slidably disposed on the rails respectively, the rear sliding member having three equally spaced top projections, the front sliding member having three equally spaced forward projections, a transverse member interconnecting the distal ends of the sliding members, and a workpiece guide bar disposed on the transverse member; wherein the workpiece guide bar is spring biased and pivotably secured to a rear end of the workpiece guide bar; wherein the workpiece guide bar includes a front locking element configured to lock the front sliding member, a rear locking element configured to lock the rear sliding member, the rear locking element having a horizontally forward recess for complimentary receipt of the top projection, the front locking element having a vertically downward recess for complimentary receipt of the forward projection and a spring biased lever pivotably secured to a front end of the workpiece guide bar, the lever having a latch and an internal, intermediate wedge member; and wherein in a first position, the wedge member clears the front sliding member, the latch is disengaged from a protuberance of the front sliding member, the front locking element is unlocked, and the rear and front locking elements are configured to unlock the rear and front sliding members respectively; and wherein in a second position, the wedge member is partially disposed in the front sliding member, the latch is engaged with the protuberance, the front locking element is locked, and the rear and front locking elements are configured to lock the rear and front sliding members respectively.

The above and other objects, features and advantages of the invention will become apparent from the following detailed description taken with the accompanying drawings.

DETAILED DESCRIPTION OF THE INVENTION

Figure 1:
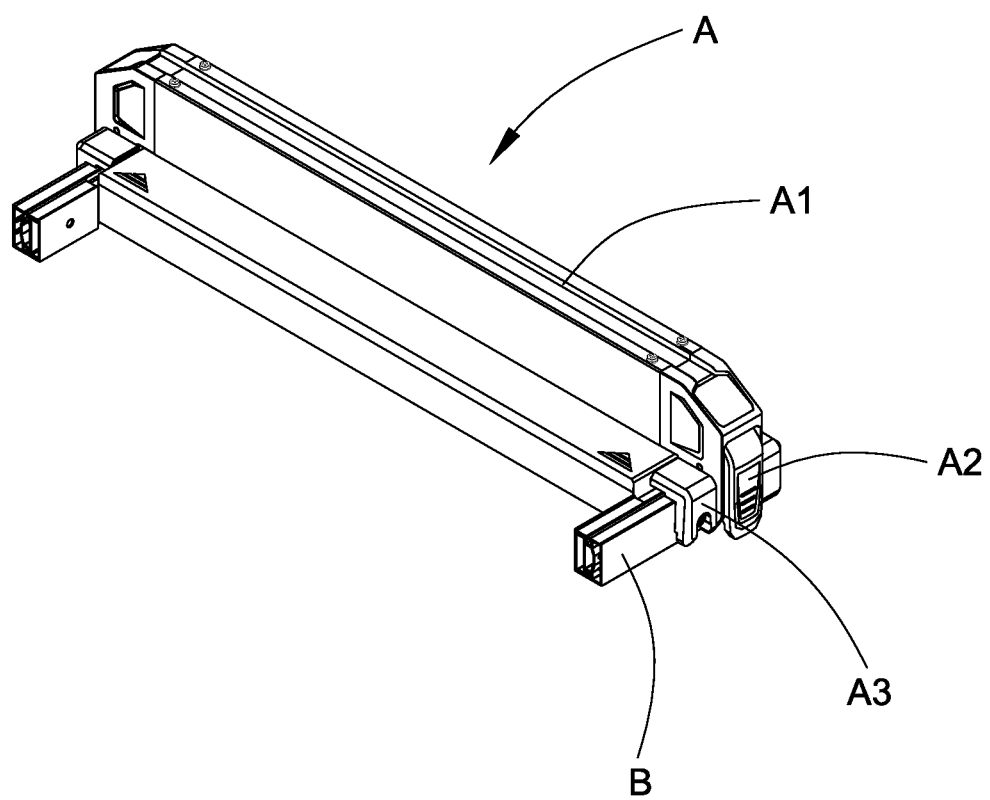
FIG. 1 is a perspective view of a conventional fence assembly of a table saw.
Figure 2:
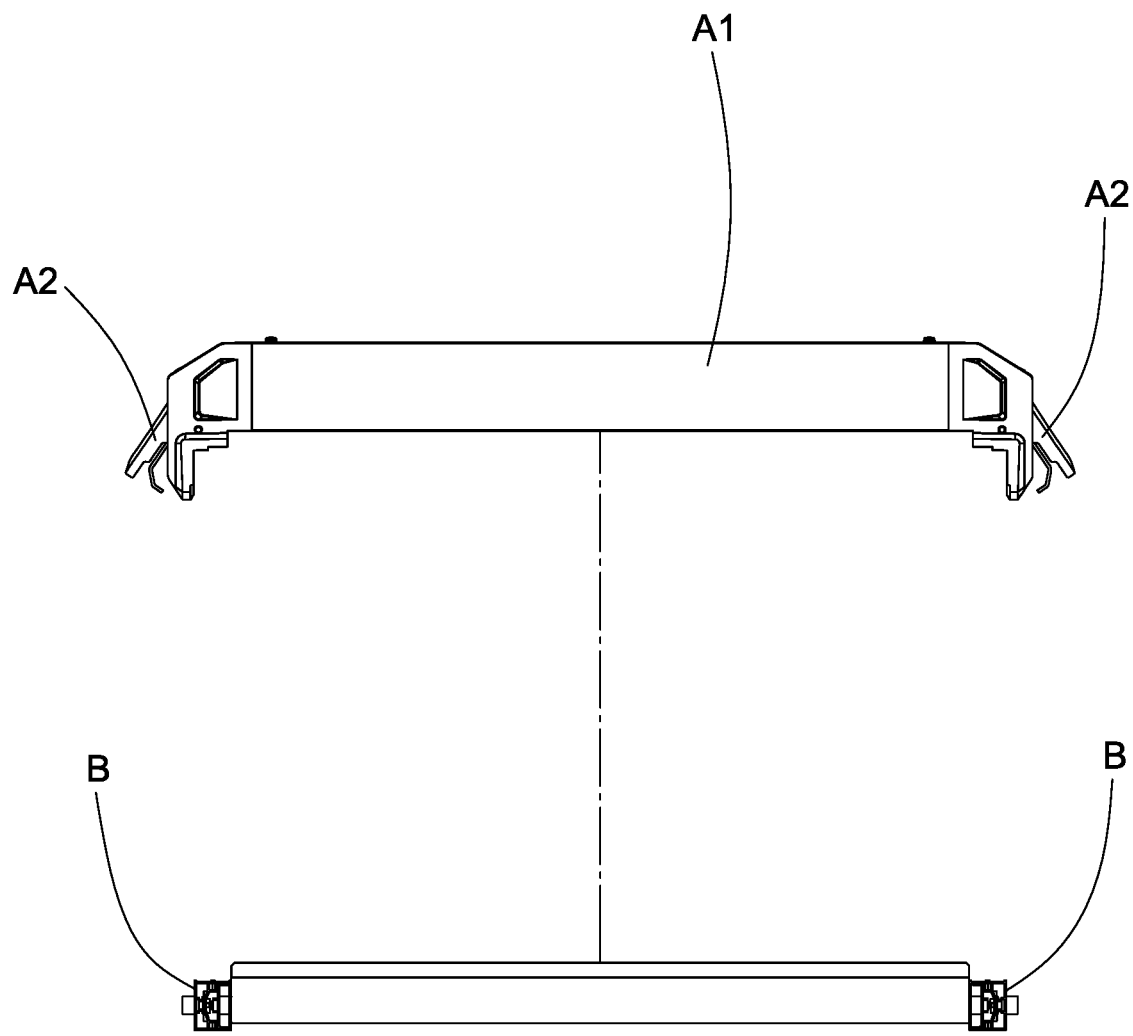
FIG. 2 is an exploded view of the fence assembly to show how to manually operate the levers to lock the lengthwise rails respectively.
Figure 3:
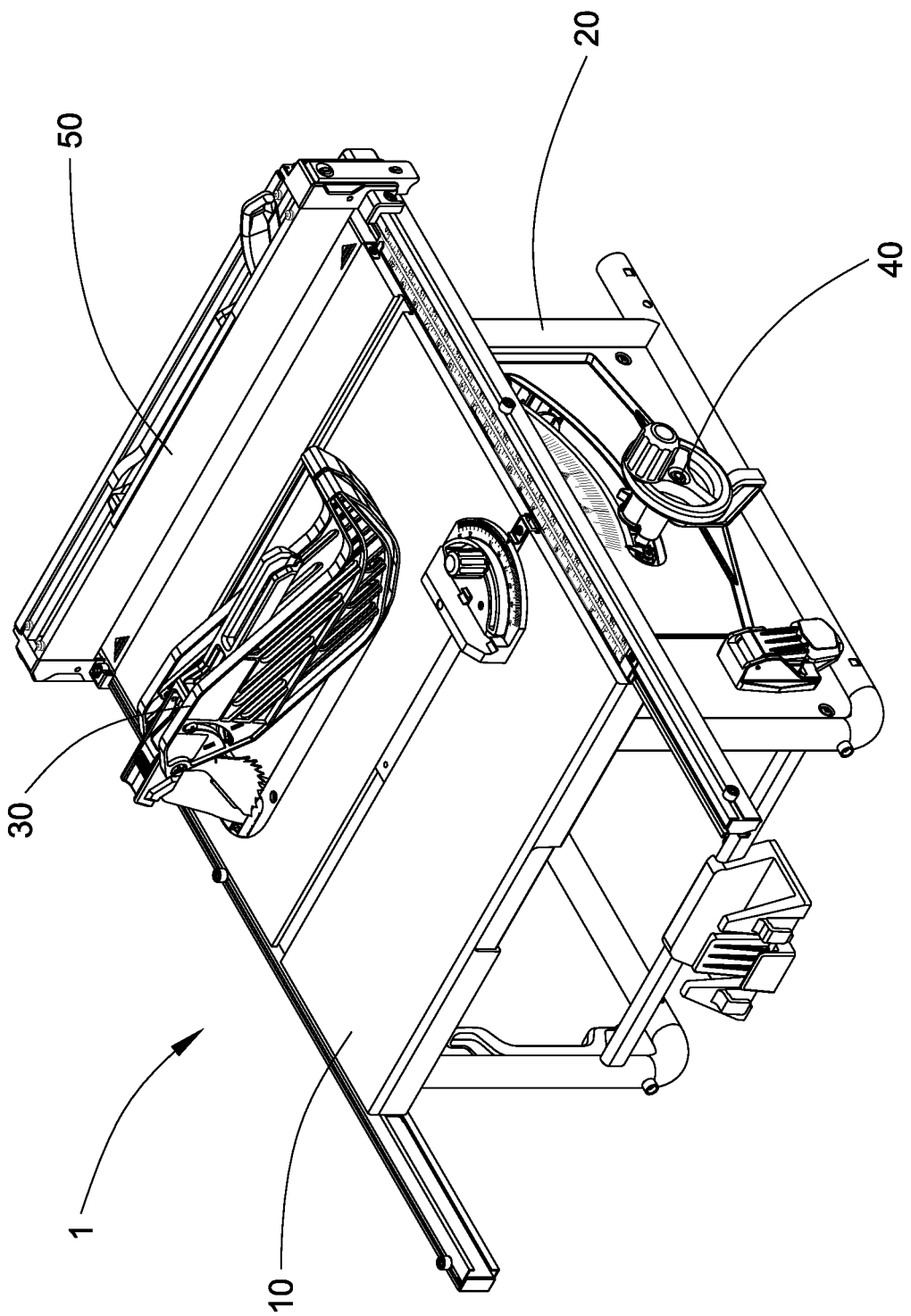
FIG. 3 is a perspective view of a table saw incorporating a distance adjustment mechanism for a fence assembly according to the invention.
Figure 4:
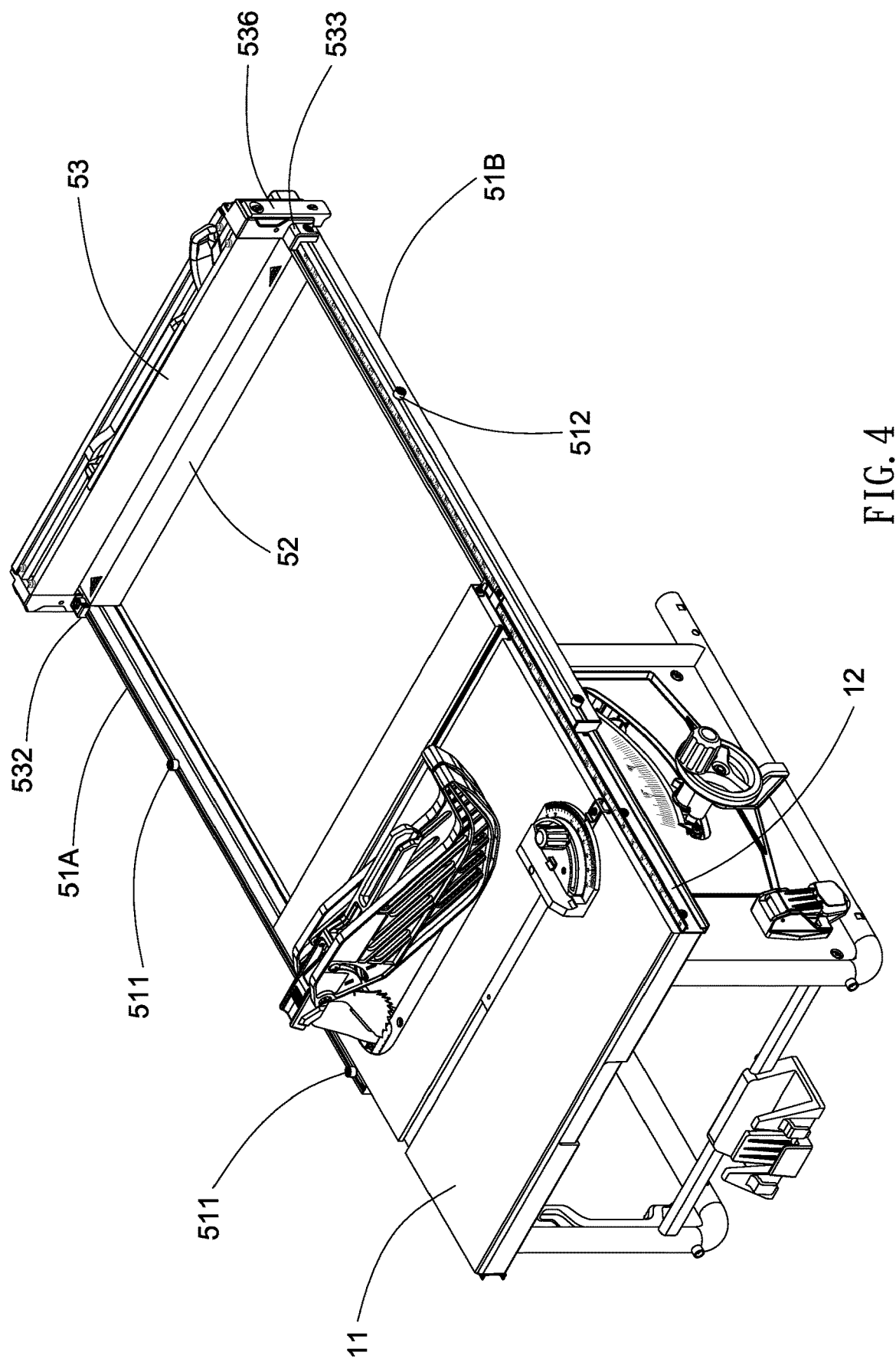
FIG. 4 is a view similar to FIG. 3 showing the fence assembly being slid laterally about the rails.
Figure 5:
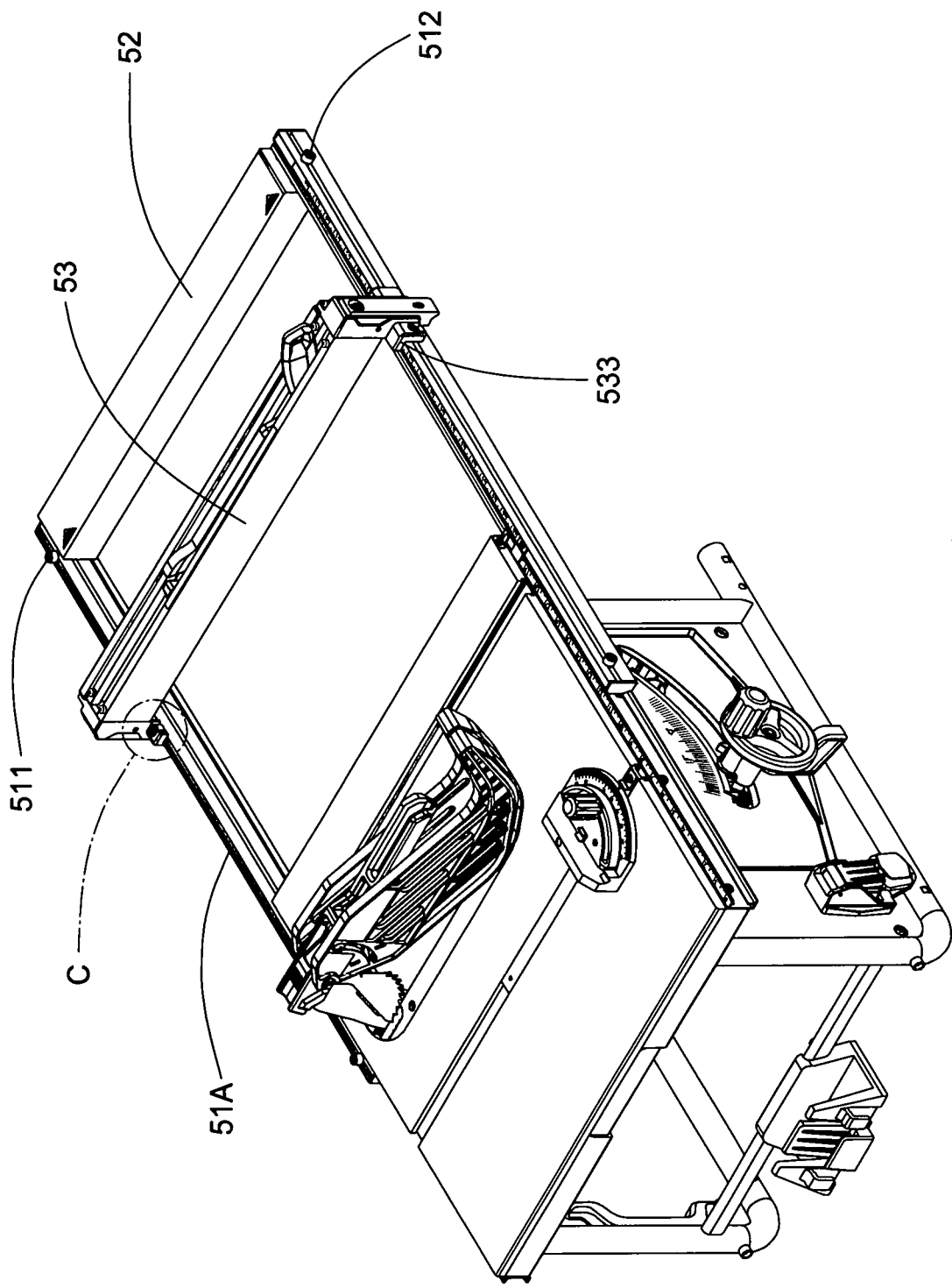
FIG. 5 is a view similar to FIG. 4 showing the fence assembly being removed and adjusted to position the transverse bar with respect to the locking elements toward the saw assembly.
Figure 6:
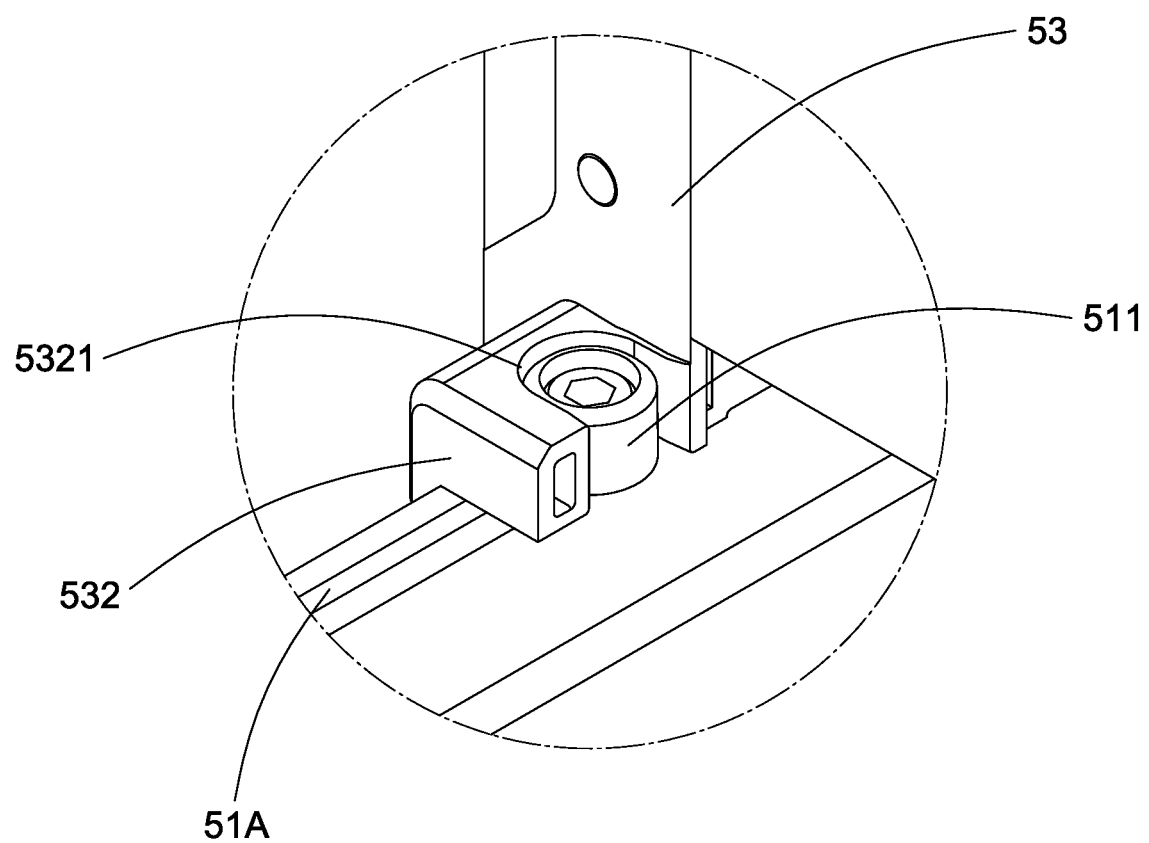
FIG. 6 is a detailed view of the area in circle C of FIG. 5.
Figure 7:
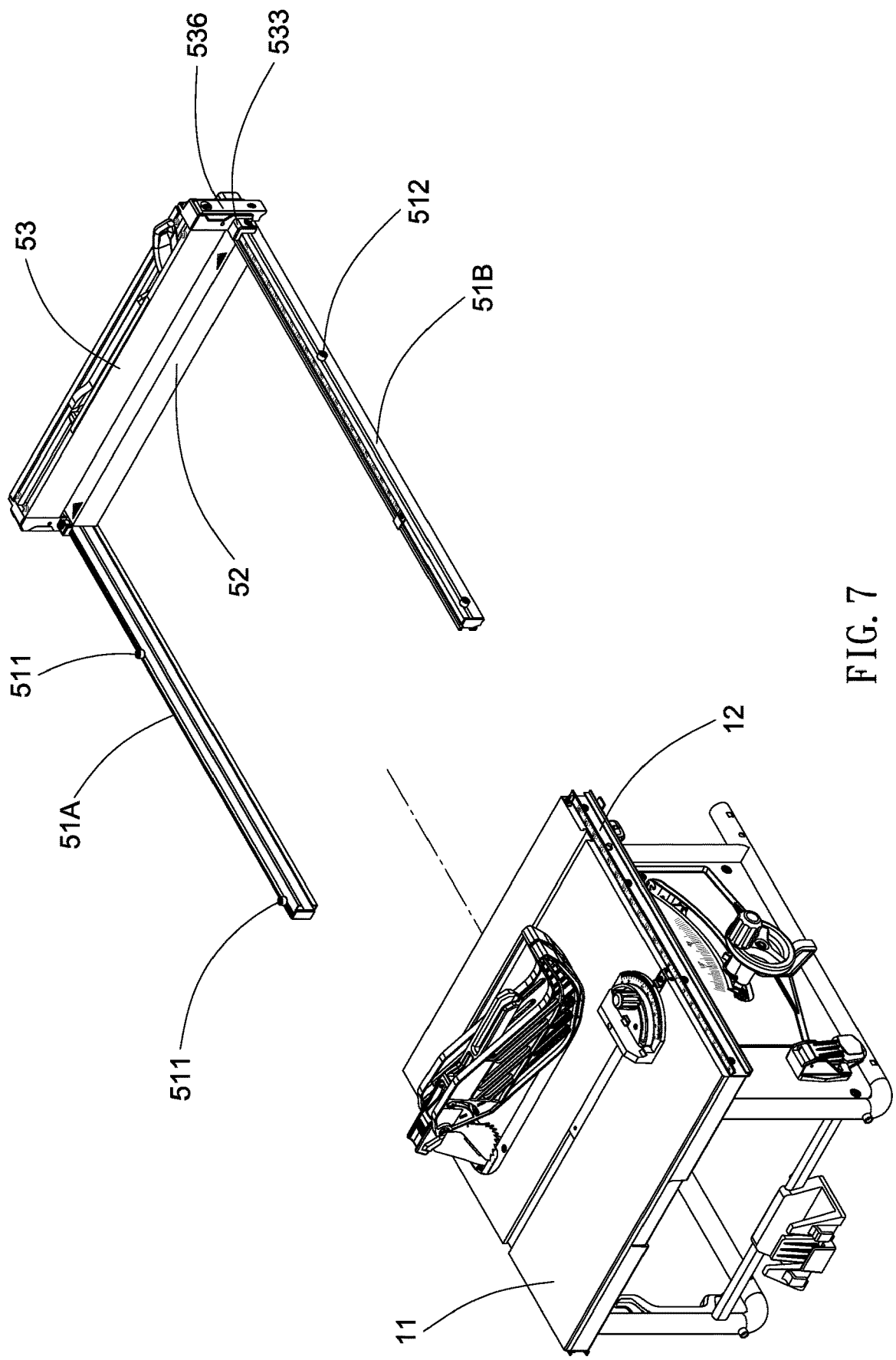
FIG. 7 is a perspective view showing the fence assembly being detached from the table saw.
Figure 8:
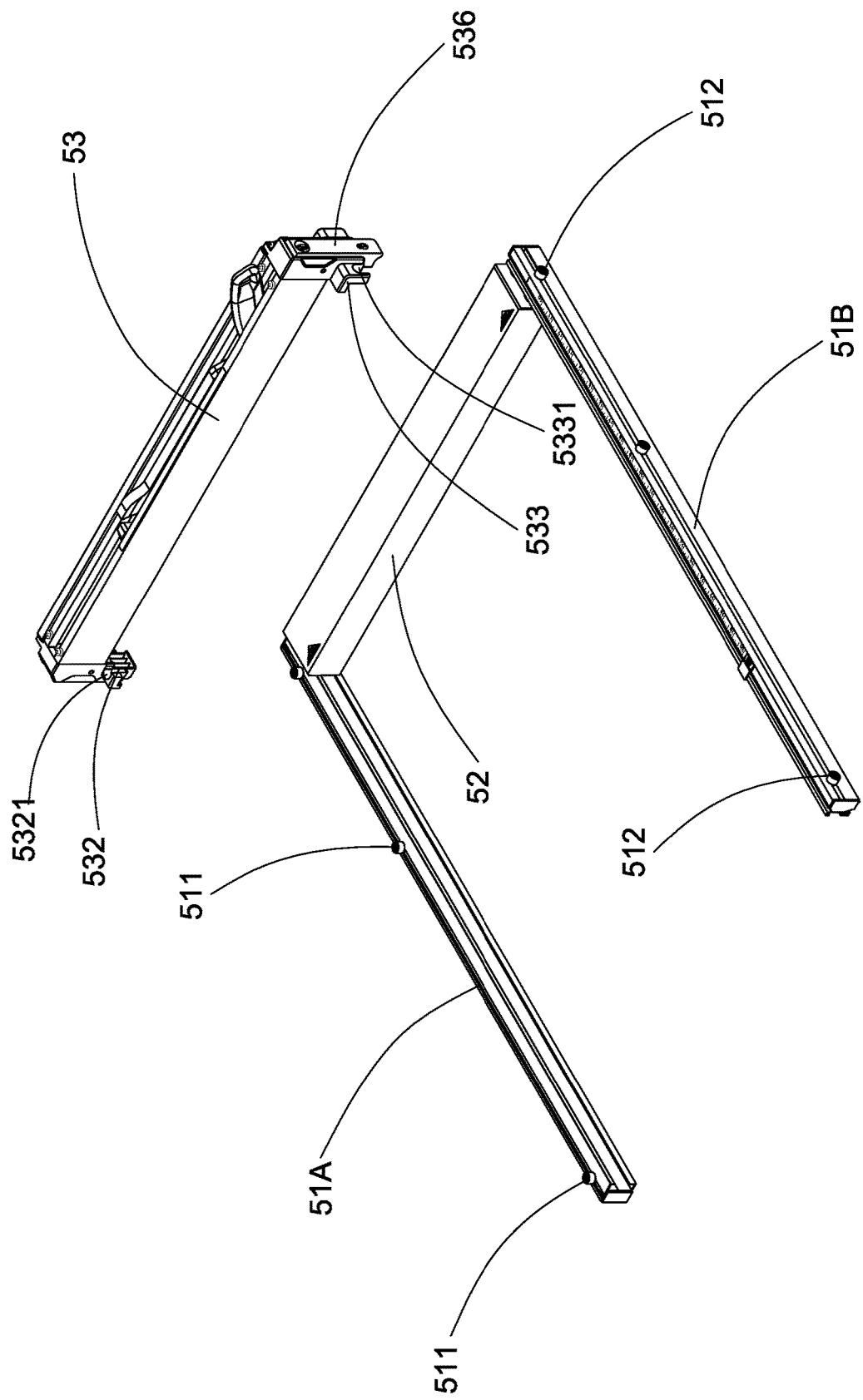
FIG. 8 is an exploded perspective view of the fence assembly.
Figure 9:
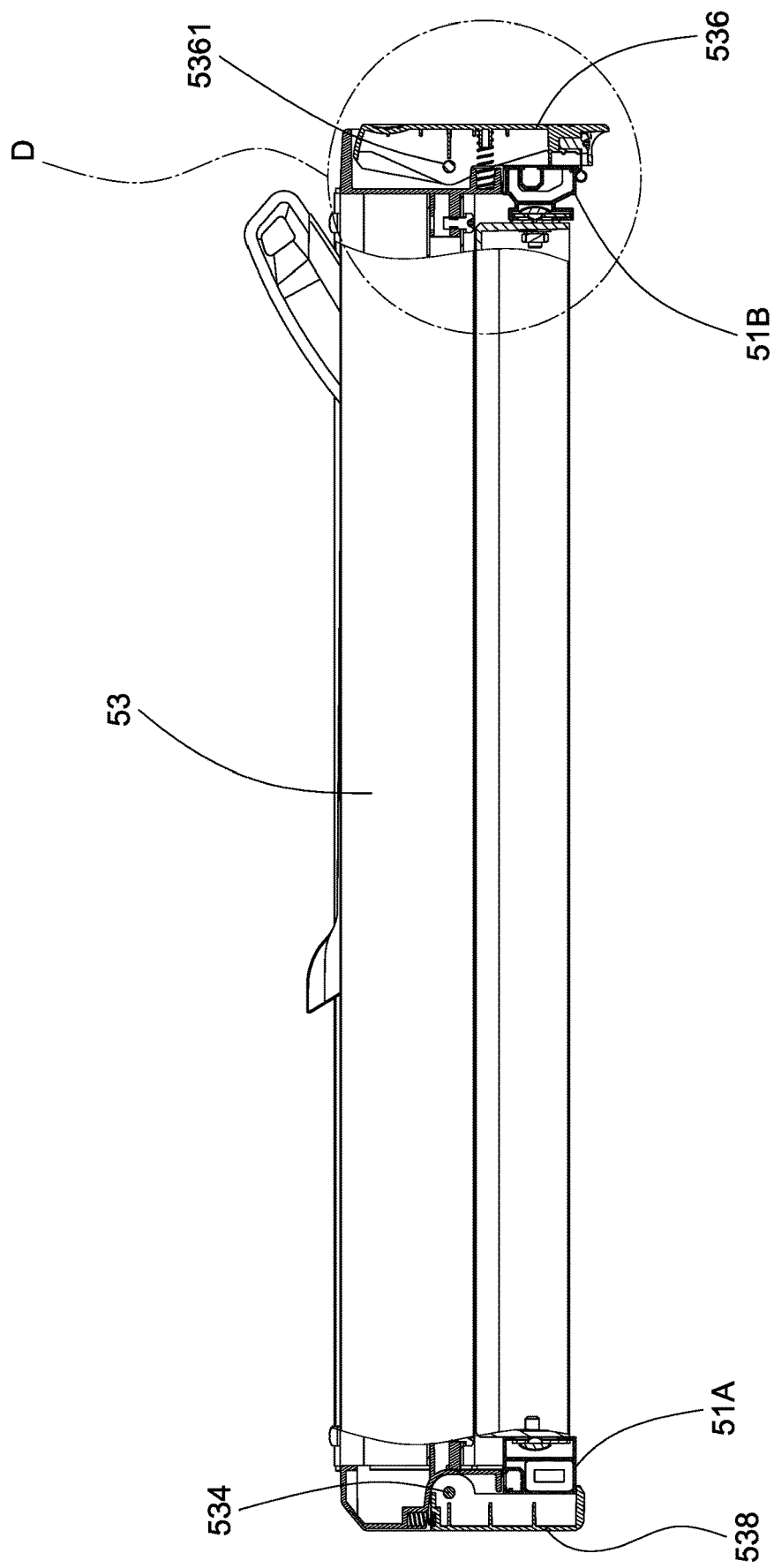
FIG. 9 is a longitudinal sectional view of the fence assembly where the lever is locked.

Referring to FIGS. 3 to 16, a table saw 1 in accordance with the invention comprises the following components as discussed in detail below.

A table assembly 10 includes a rectangular table 11 and two rails 12 on front and rear ends of the table 11 respectively. A base assembly 20 supports the table assembly 10.

A saw assembly 30 is disposed on the table assembly 10. A height adjustment assembly 40 is disposed on a front panel of the base assembly 20. A fence assembly 50 as the subject of the invention is discussed in detail below.

The fence assembly 50 includes lengthwise rear and front sliding members 51A, 51B slidably disposed on the rails 12 respectively, the rear sliding member 51A having three equally spaced top projections 511, the front sliding member 51B having three equally spaced forward projections 512, a transverse member 52 interconnecting the distal ends of the sliding members 51A, 51B, and a workpiece guide bar 53 disposed on the transverse member 52 and having two ends disposed on the sliding members 51A, 51B respectively.

The workpiece guide bar 53 includes a rectangular, pivotal side plate 531 on an outer surface, the side plate 531 having two protrusions 5311 on two ends respectively, the protrusions 5311 configured to releasably secure to two cavities 5312 on the outer surface of the workpiece guide bar 53 respectively so that the side plate 531 may be open or close.

An inner surface of either end of the workpiece guide bar 53 further comprises a rear locking element 532 having a horizontally forward recess 5321 for complimentary receipt of the top projection 511, and a front locking element 533 having a vertically downward recess 5331 for complimentary receipt of the forward projection 512. The front locking element 533 is secured to an inner surface of the workpiece guide bar 53. The rear and front locking elements 532, 533 are configured to lock the rear and front sliding members 51A, 51B respectively. Further, a rear end of the workpiece guide bar 53 is pivotally secured to a support member 538 by means of a pivot 534 and a compression spring 535. Thus, the rear end of the workpiece guide bar 53 and the support member 538 may be resiliently connected together. A bottom of the support member 538 is provided with a tab 5381 for supporting the rear sliding member 51A. Side of the support member 538 is secured to the rear locking element 532. Thus, the rear end of the workpiece guide bar 53 and the rear locking element 532 are resiliently connected together.

Furthermore, the receipt of the projection 511 in the recess 5321 slidably positions the workpiece guide bar 53 on the rear sliding members 51A, the receipt of the projection 512 in the recess 5331 slidably positions the workpiece guide bar 53 on the front sliding member 51B.

The workpiece guide bar 53 further comprises a lever 536 pivotally secured to a front end thereof by means of a pivot 5361 and a compression spring 5362, and a latch 537 on a lower, inner portion.

Figure 12:
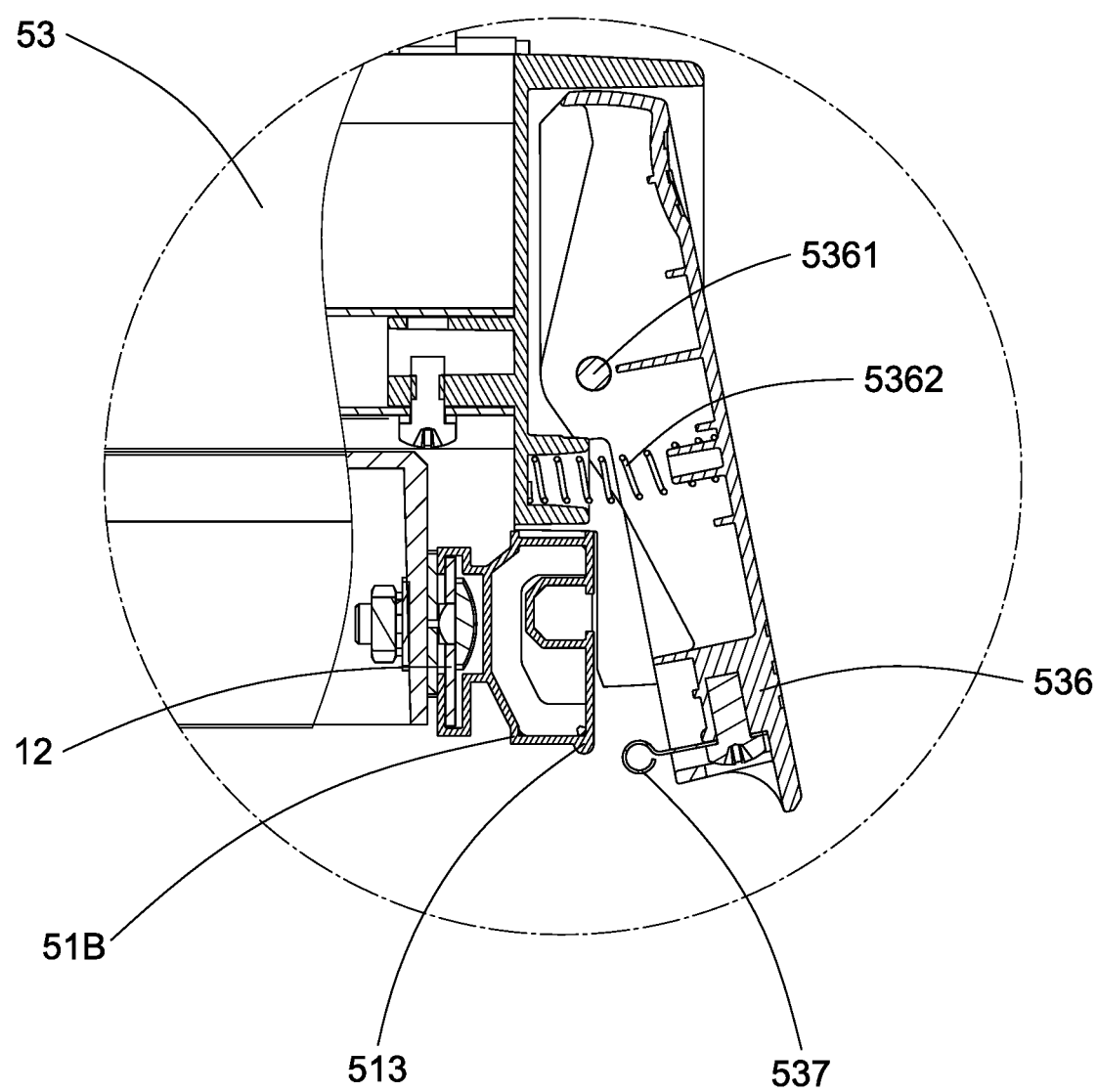
FIG. 12 is a detailed view of the area in circle E of FIG. 11.
Figure 13:
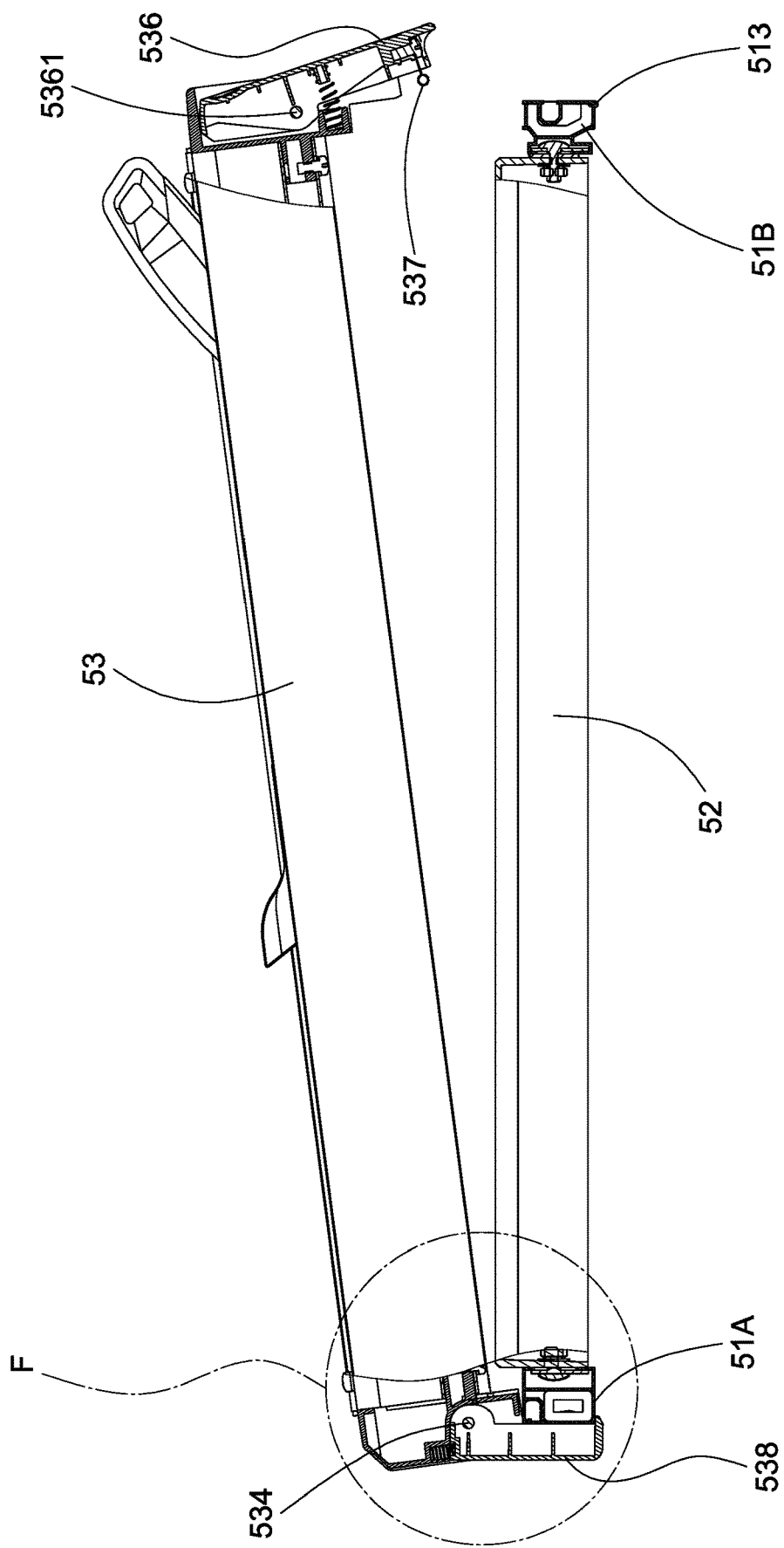
FIG. 13 is another longitudinal sectional view of the fence assembly where the bar is pivoted about a rear end thereof.
Figure 14:
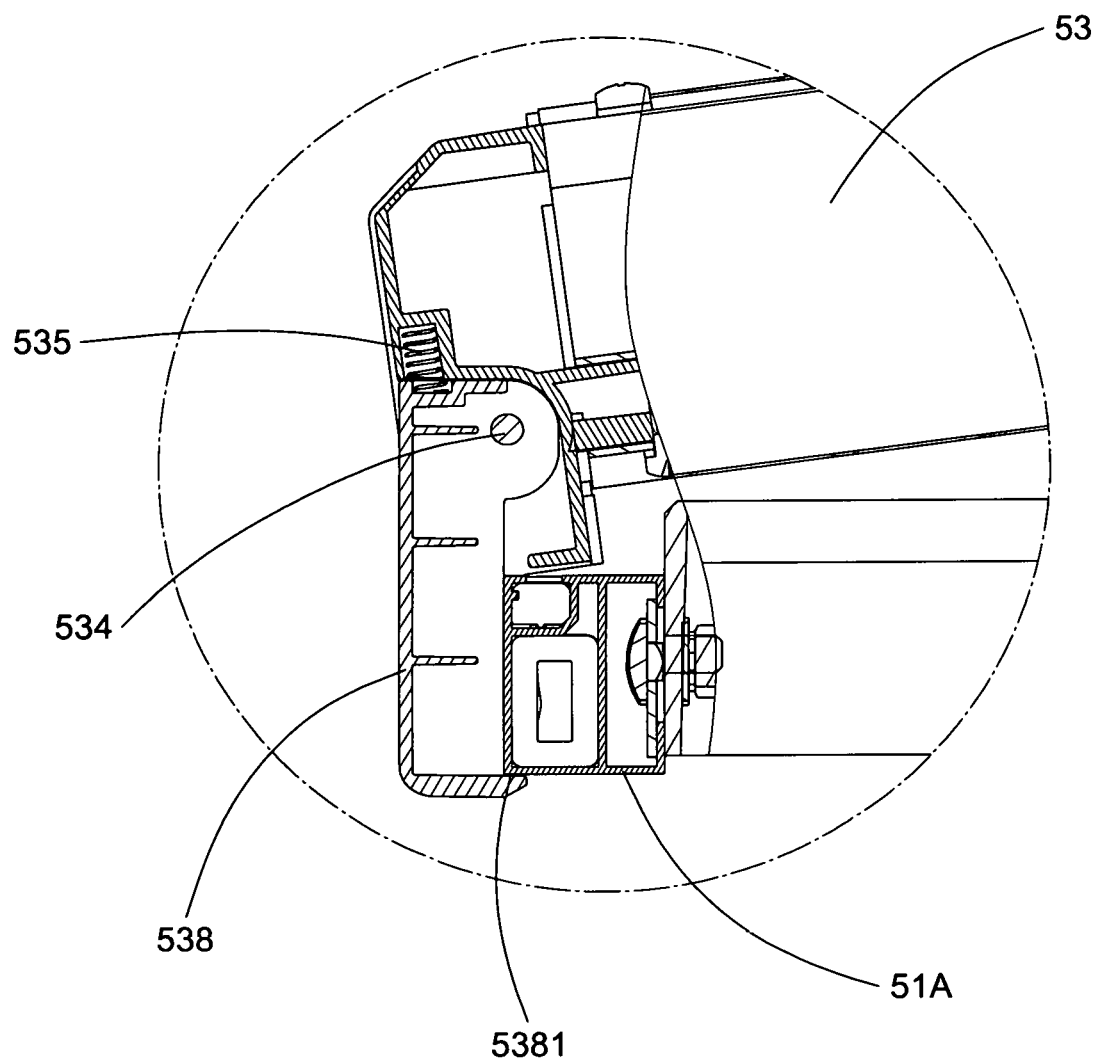
FIG. 14 is a detailed view of the area in circle F of FIG. 13.
Figure 15:
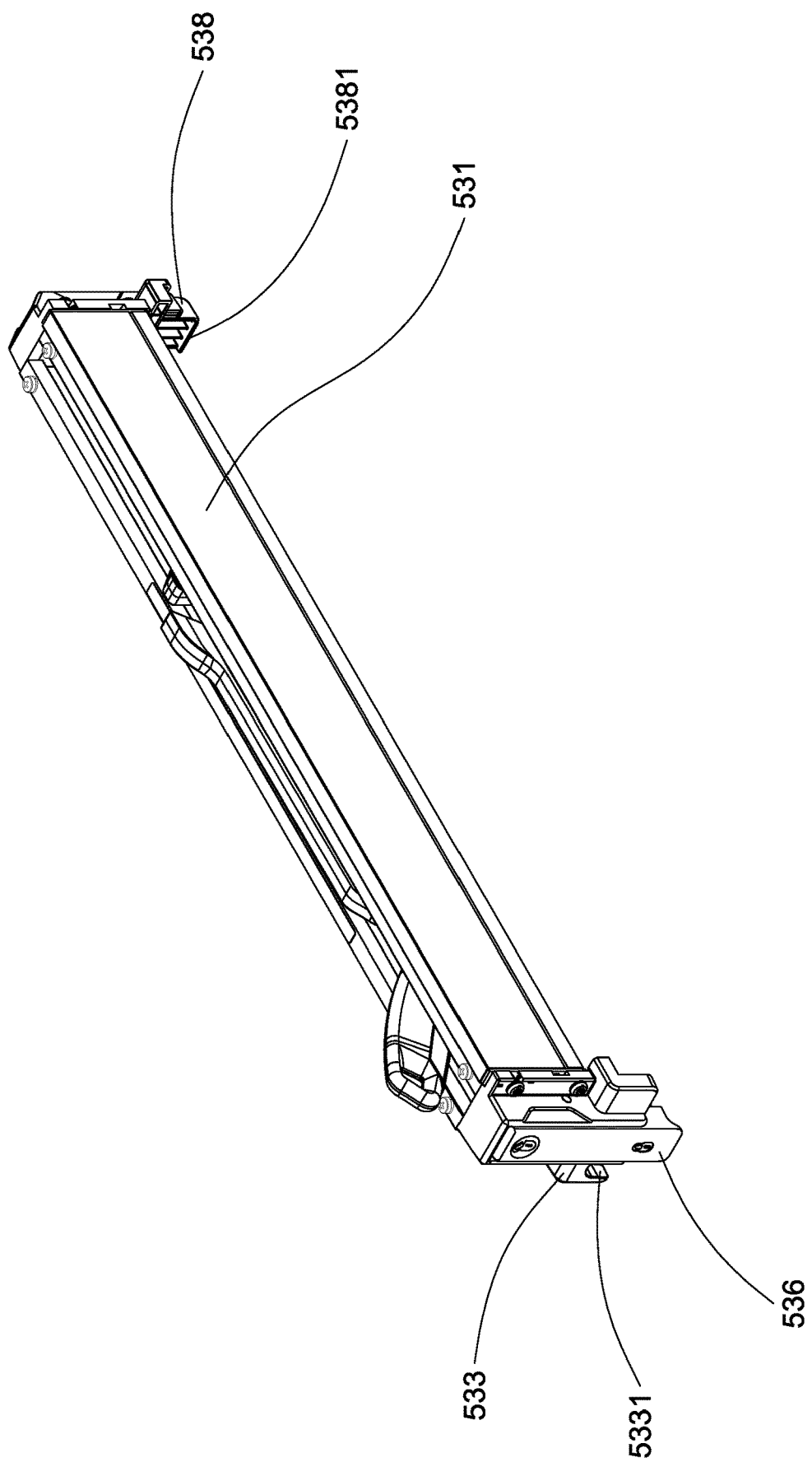
FIG. 15 is a perspective view of the main portion of the fence assembly.
Figure 16:
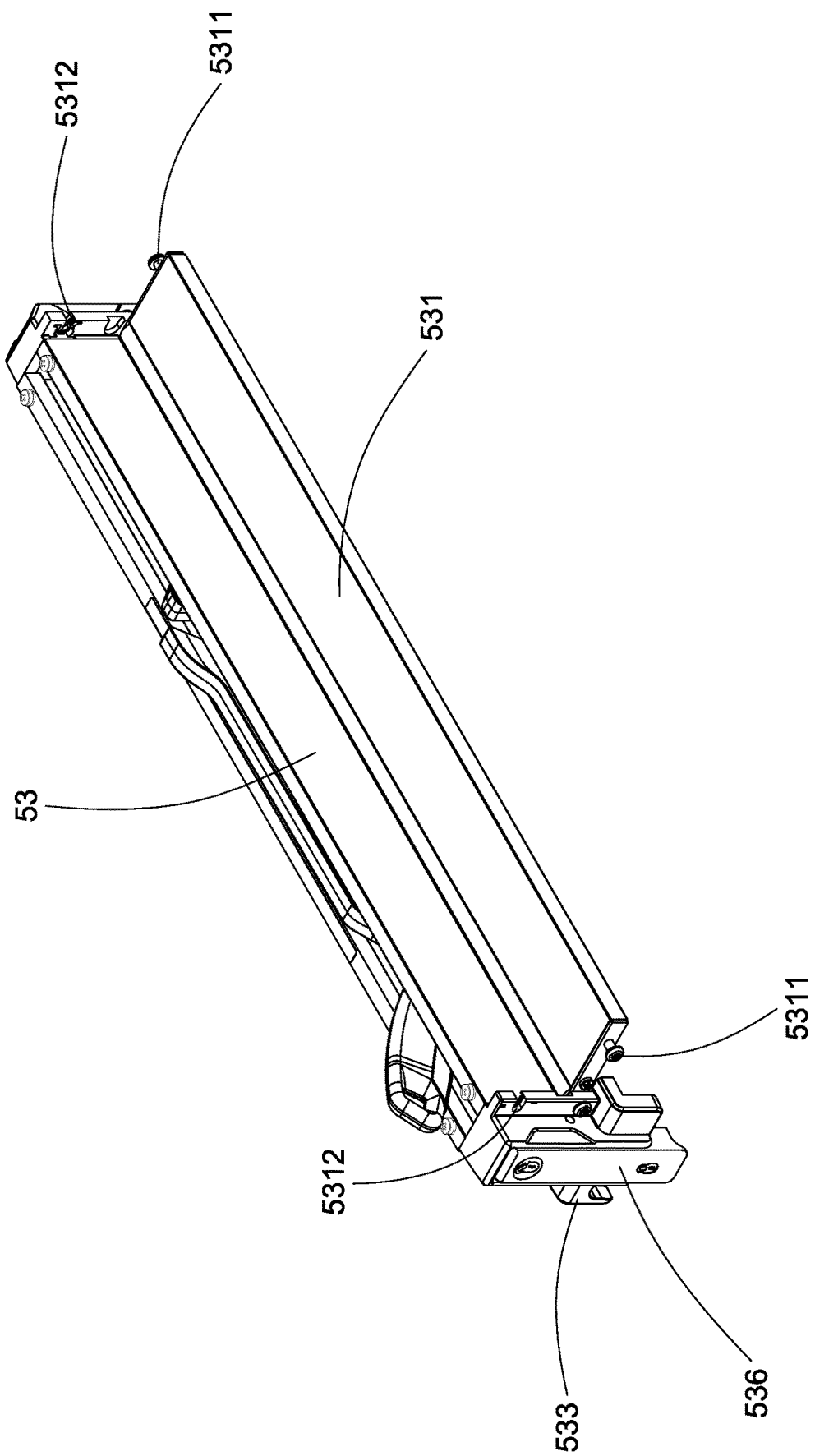
FIG. 16 is a view similar to FIG. 15 showing the side plat being open.
Figure 17:
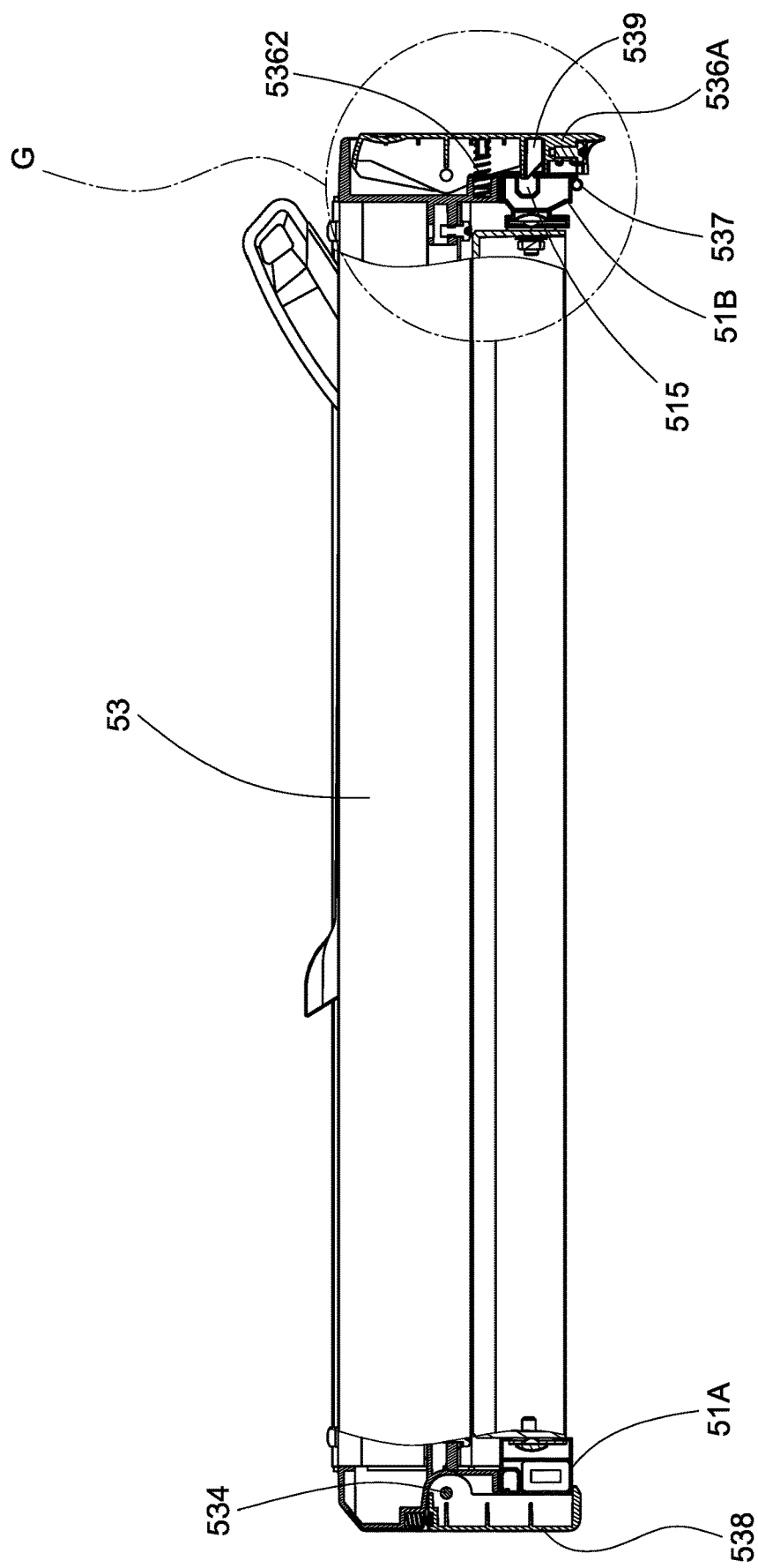
FIG. 17 is a longitudinal sectional view of the fence assembly where the lever of a second embodiment is locked.
Figure 18:
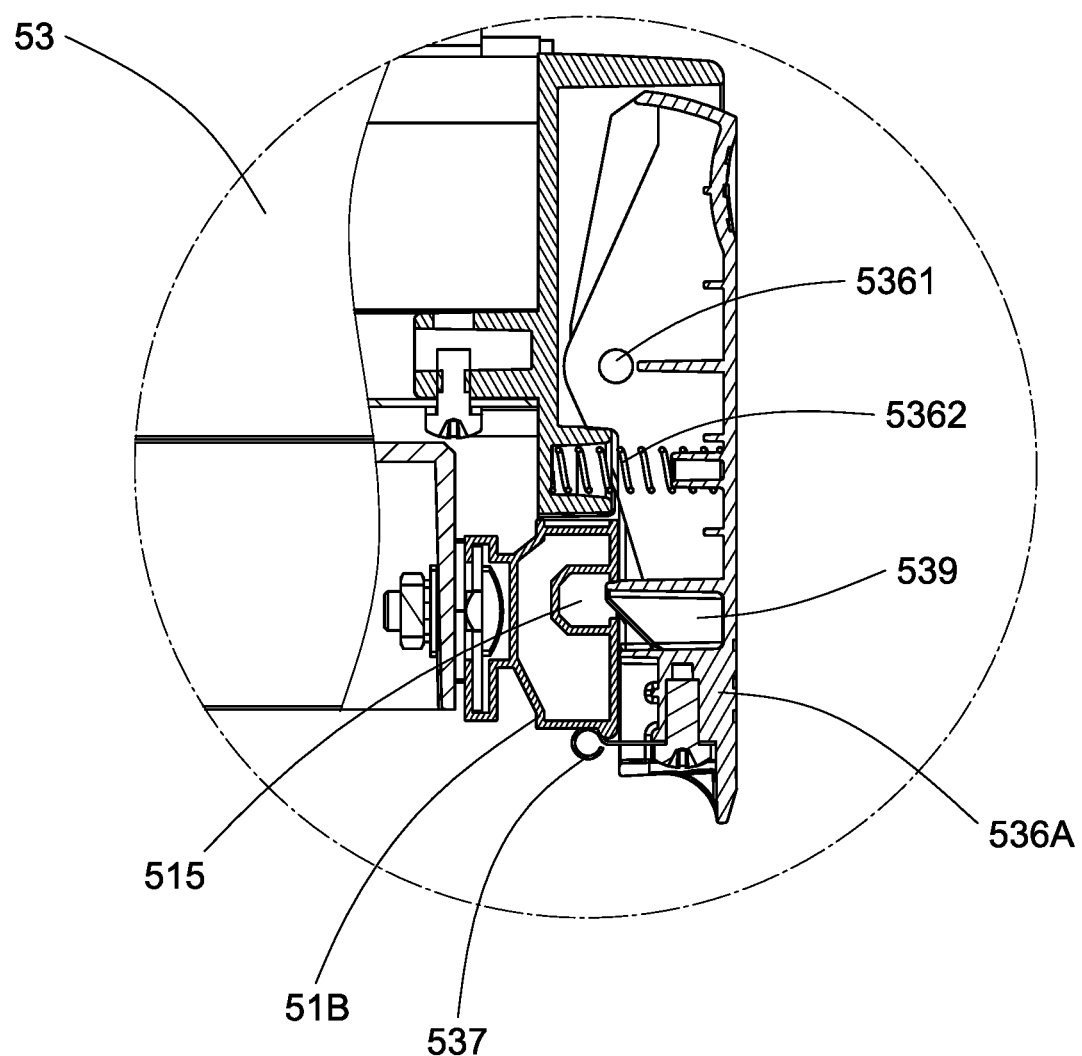
FIG. 18 is a detailed view of the area in circle G of FIG. 17.
Figure 19:
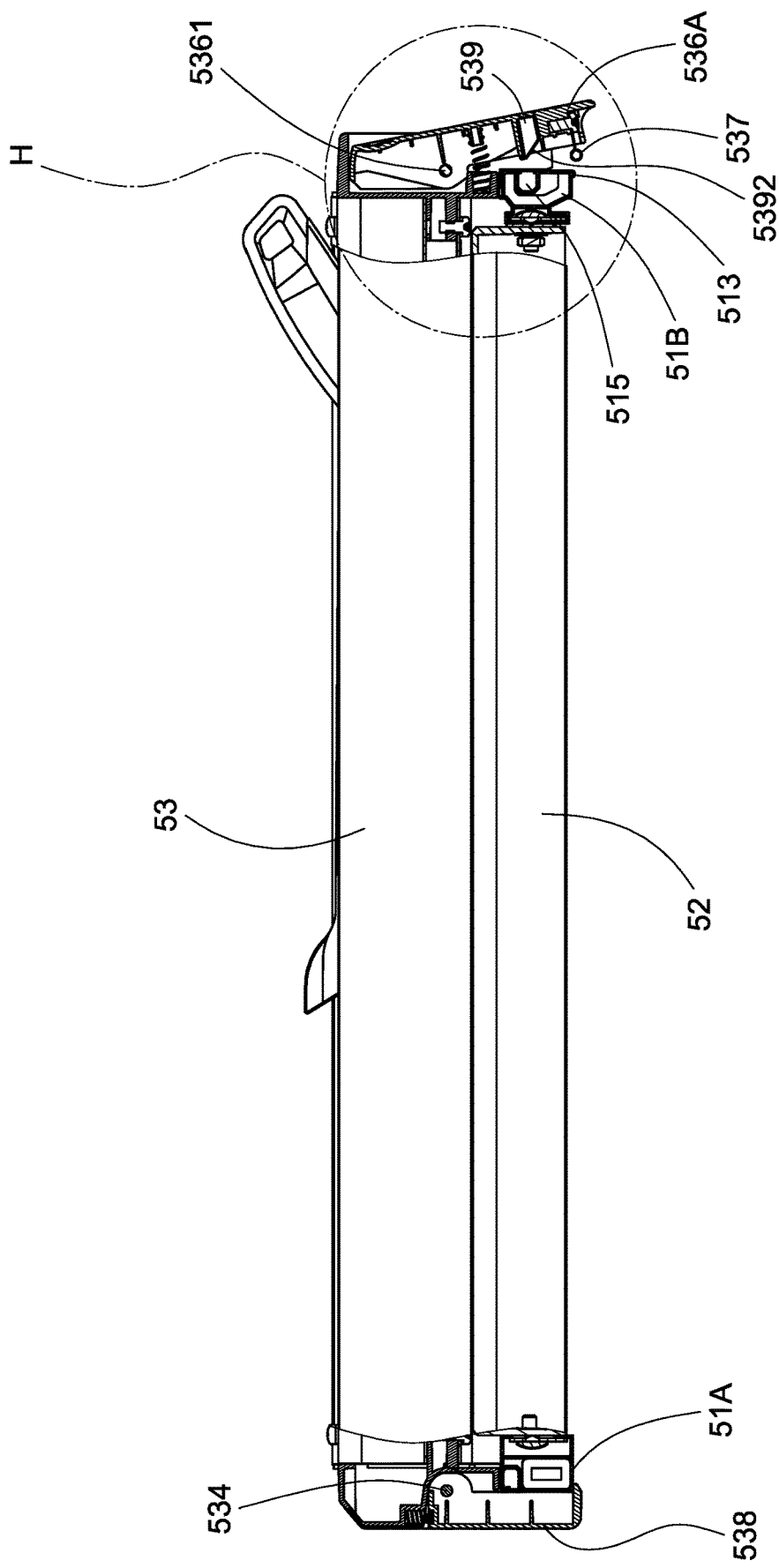
FIG. 19 is a longitudinal sectional view of the fence assembly where the lever of the second embodiment is unlocked.
Figure 20:
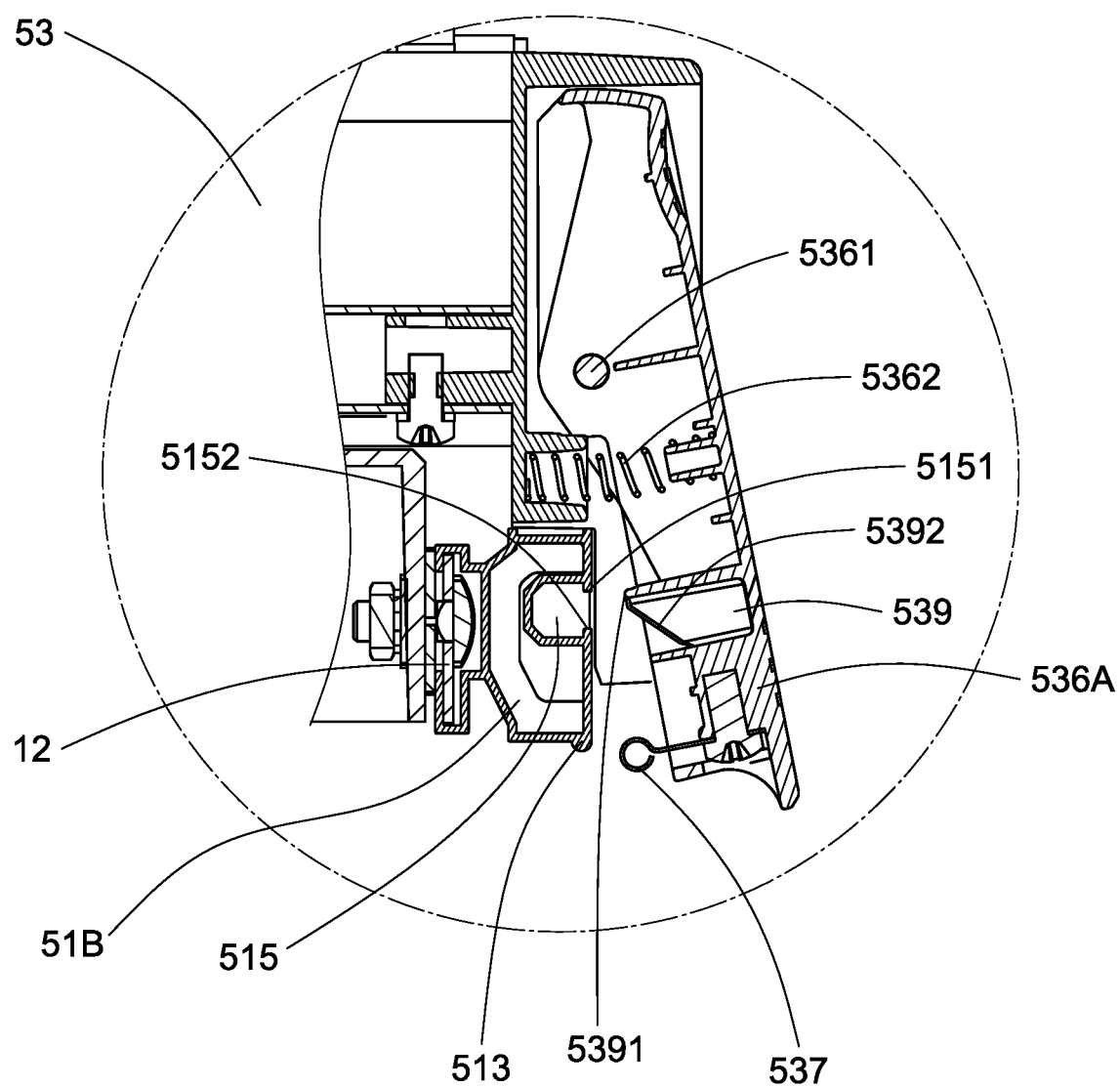
FIG. 20 is a detailed view of the area in circle H of FIG. 19.
Figure 21:
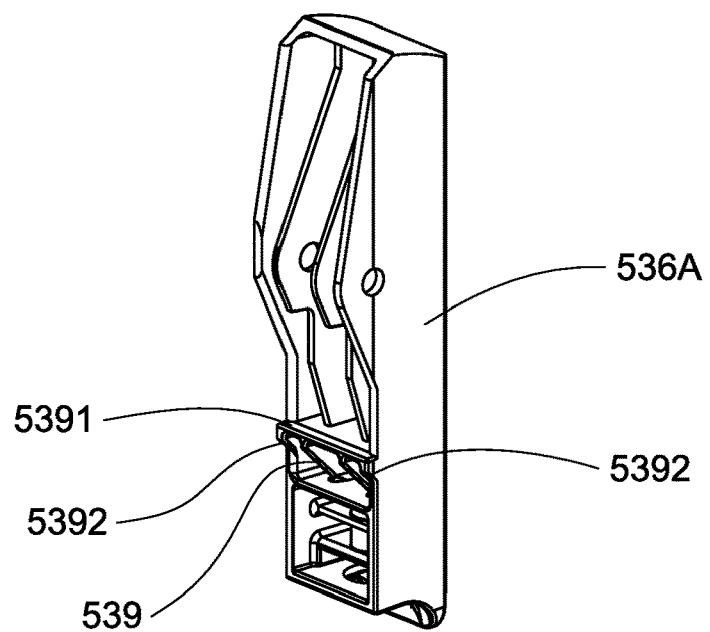
FIG. 21 is a perspective view of the lever of the second embodiment.
Figure 22:
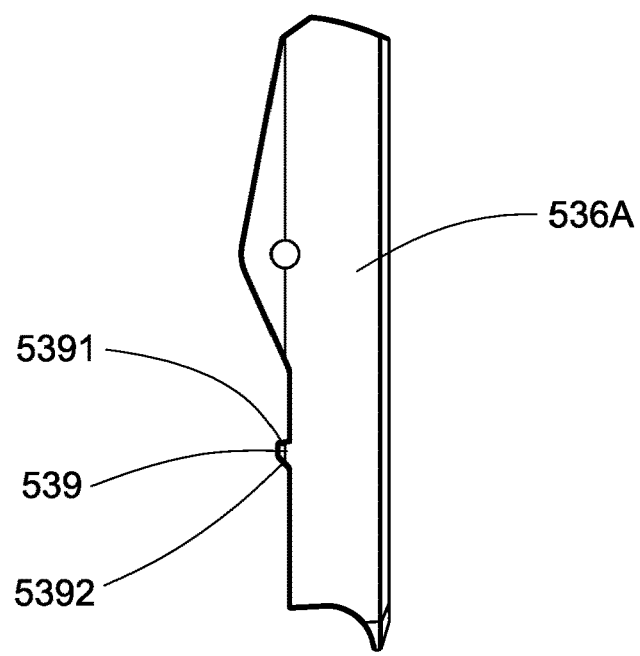
FIG. 22 is a side elevation view of the lever of FIG. 21.

The latch 537 is disengaged from a protuberance 513 on a bottom of the front sliding member 51B (see FIG. 12). The workpiece guide bar 53 is unlocked. Thus, the rear and front locking elements 532, 533 are capable of sliding on the rear and front sliding members 51A, 51B respectively. As a result, the workpiece guide bar 53 is unlocked and can be lifted obliquely (see FIG. 13). Further, the workpiece guide bar 53 can be adjusted horizontally with respect to another set of the projection 511 and the projection 512. A user may press the lever 536 to lock the workpiece guide bar 53 (see FIG. 10). As a result, a distance between the workpiece guide bar 53 and the saw assembly 30 can be adjusted.

Figure 10:
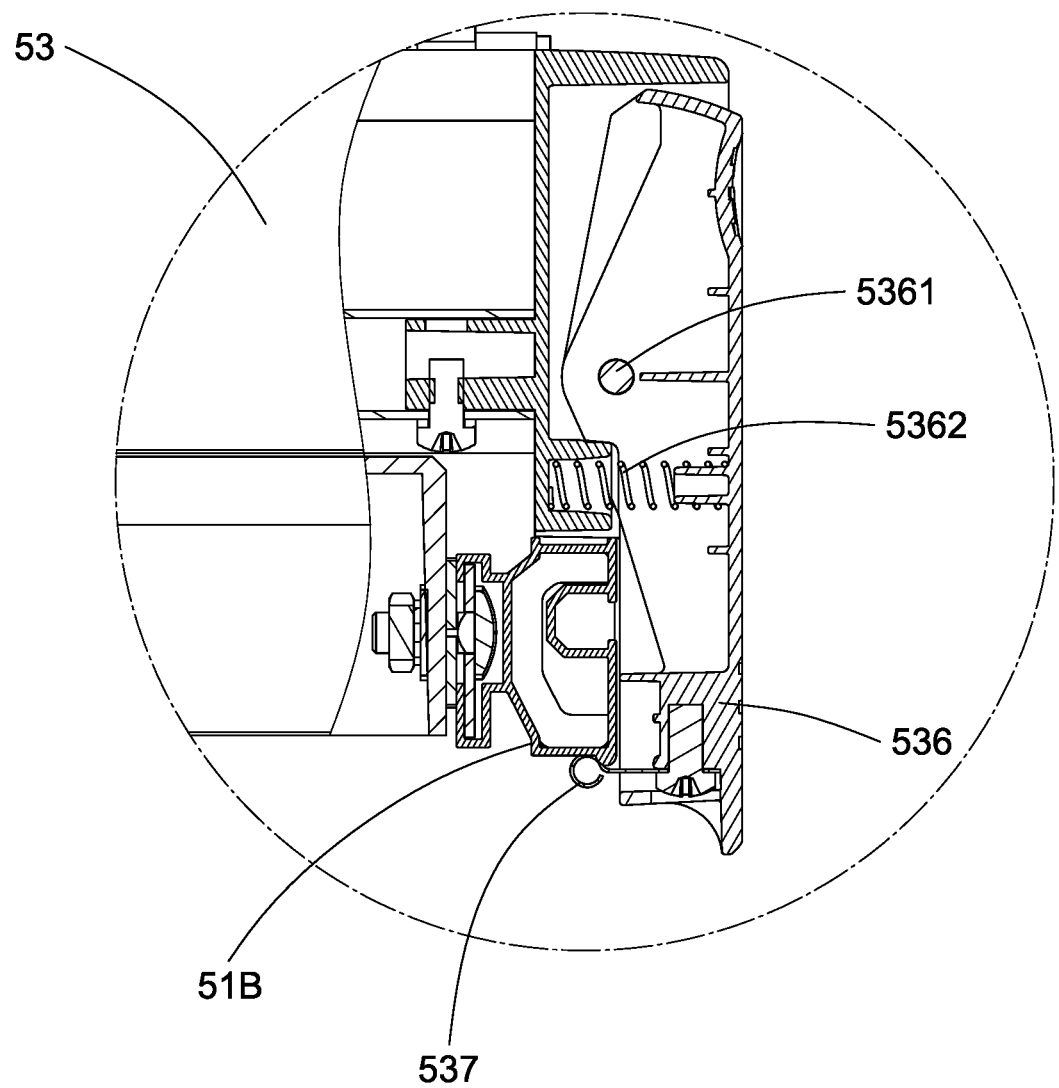
FIG. 10 is a detailed view of the area in circle D of FIG. 9.
Figure 11:
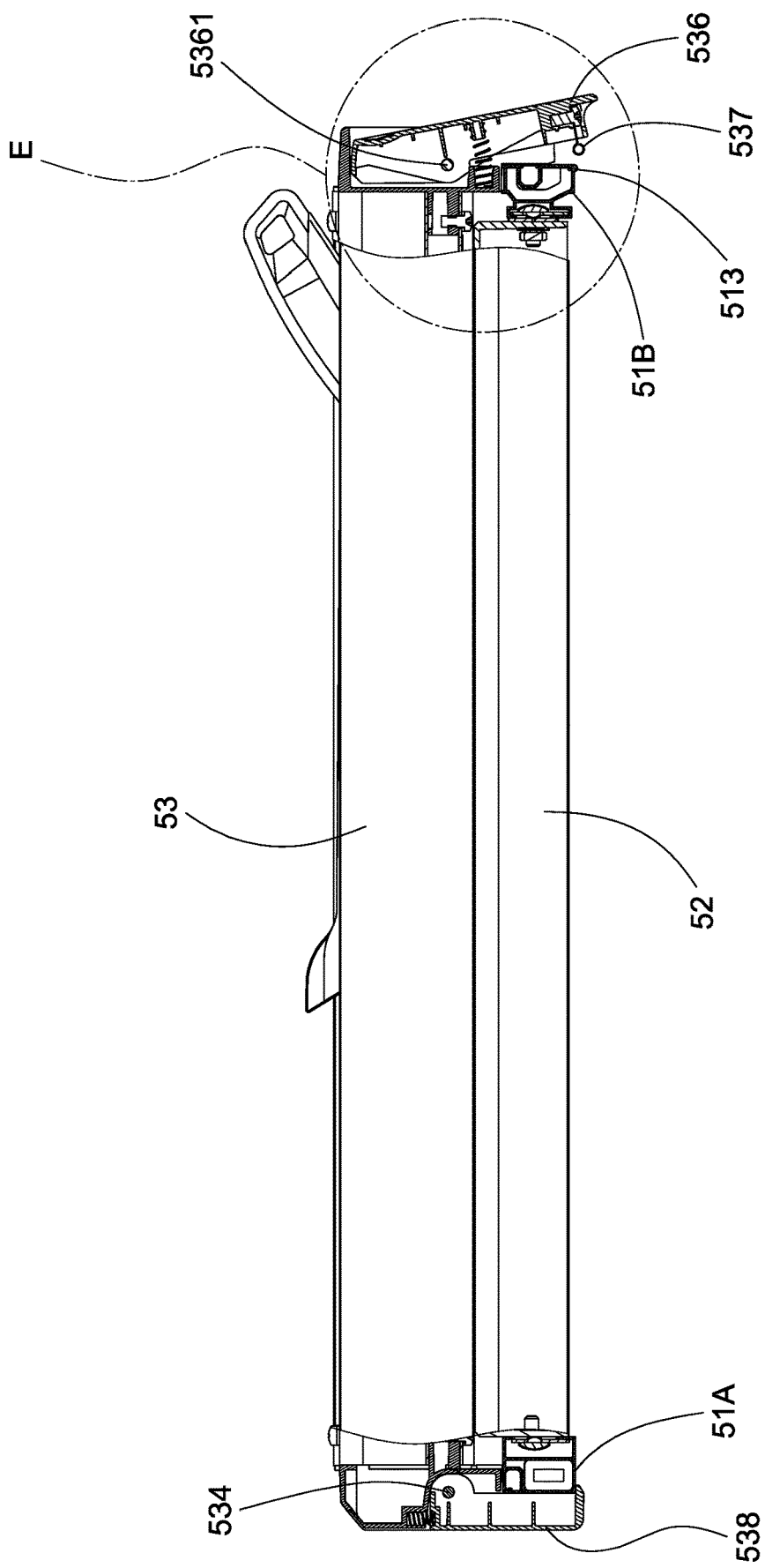
FIG. 11 is a view similar to FIG. 9 where the lever is unlocked.

It is clear that the latch 537 is engaged with the protuberance 513 on the bottom of the front sliding member 51B by clockwise pivoting the lever 536 (see FIG. 10). The lever 536 is locked. Thus, the rear and front locking elements 532, 533 are not capable of sliding on the rear and front sliding members 51A, 51B respectively. As a result, the distance between the workpiece guide bar 53 and the saw assembly 30 is fixed.

Referring to FIGS. 17 to 22, a second embodiment of a lever 536A is shown. The lever 536A is pivotally secured to a front end thereof by means of a pivot 5361 and a compression spring 5362. The latch 537 is provided on a lower portion of the lever 536A. The characteristics of the second embodiment of the lever 536A are detailed below. An internal, intermediate wedge member 539 is provided in the lever 536A and includes a top plate 5391 and a plurality of inclined members 5392. Correspondingly, a C-shaped lengthwise channel 515 is provided in the front sliding member 51B and includes an upper edge 5151 and a lower edge 5152. In a locked position, the wedge member 539 is partially disposed in the lengthwise channel 515 of the front sliding member 51B with the top plate 5391 urging against the upper edge 5151 and the inclined ends 5392 slidably joining the lower edge 5152. As a result, the fastening of the lever 536A and the front sliding member 51B in the locked position is improved.

While the invention has been described in terms of preferred embodiments, those skilled in the art will recognize that the invention can be practiced with modifications within the spirit and scope of the appended claims.

What is claimed is:
1. A table saw comprising:
   a table assembly including a table and two rails on front and rear ends of the table respectively, the table defining a workpiece support surface;
   a base assembly for supporting the table assembly;
   a saw assembly disposed on the table assembly; and
   a fence assembly including rear and front sliding members, the rear and front sliding members slidably disposed on the rails respectively, the rear sliding member having three spaced top projections that project in a vertical direction perpendicular to the workpiece support surface, the front sliding member having three spaced forward projections that project in a horizontal direction perpendicular to the vertical direction, and a workpiece guide bar having rear and front ends, the rear and front ends of the workpiece guide bar disposed on the rear and front sliding members respectively, and the workpiece guide bar including a rear positioning element having a horizontally forward recess for complimentary receipt one of the top projections and the workpiece guide bar including a front positioning element having a vertically downward recess for complimentary receipt one of the forward projections, the workpiece guide bar including a front locking element configured to lock the workpiece guide bar on the front sliding member, and the workpiece guide bar including a rear locking element configured to lock the workpiece guide bar on the rear sliding member, the front locking element including a spring biased lever pivotally secured to the front end of the workpiece guide bar, and the spring biased lever having a latch and an internal, intermediate wedge member, and the rear locking element including a tab disposed on a bottom of the rear locking element for engaging the rear sliding member;
   wherein the wedge member includes a top plate and a plurality of inclined members;
   wherein the front sliding member includes a C-shaped lengthwise channel, the lengthwise channel having an upper edge and a lower edge, the wedge member being selectively locked by the lengthwise channel;

wherein the rear end of the workpiece guide bar is pivotable at the rear locking element by a pivot and a compression spring;

wherein in order to remove the workpiece guide bar from the table assembly, a pivotal operation of the spring biased lever disengages the latch from a protuberance on a bottom of the front sliding member and disengages the wedge member from the lengthwise channel to unlock the front locking element, allowing the front end of the workpiece guide bar to be lifted upward and then pushed rearward toward the rear end of the workpiece guide bar to disengage the rear locking element from the rear sliding member; and wherein in order to attach the workpiece guide bar to the table assembly, the tab is urged to engage the rear sliding member from below and the horizontally forward recess complimentarily receives one of the top projections, subsequently the vertically downward recess complimentarily receives one of the forward projections, and a further subsequent pressing of the spring biased lever causes the latch to engage with the protuberance and the top plate of the wedge member urges against the upper edge of the channel and the inclined members of the wedge member slidably join the lower edge of the channel respectively in order to lock the front locking element such that the rear and front locking members lock the workpiece guide bar on the rear and front sliding members respectively.

\* \* \* \* \*